US006360098B1

(12) United States Patent
Ganesh et al.

(10) Patent No.: US 6,360,098 B1
(45) Date of Patent: Mar. 19, 2002

(54) METHOD AND SYSTEM FOR DETERMINING A NEIGHBOR LIST FOR A CODE DIVISION MULTIPLE ACCESS (CDMA) SECTOR

(75) Inventors: Rajamani Ganesh, Bedford; Vincent O'Byrne, Boston, both of MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/525,356

(22) Filed: Mar. 15, 2000

(51) Int. Cl.$^7$ ................................................. H04Q 7/22
(52) U.S. Cl. ...................... 455/436; 455/452; 455/525; 455/62; 370/332
(58) Field of Search ................................ 455/436–442, 455/450–452, 525, 67.1, 62, 63, 65; 370/331–333

(56) References Cited

U.S. PATENT DOCUMENTS

| | | | |
|---|---|---|---|
| 5,134,709 A | | 7/1992 | Bi et al. |
| 5,574,466 A | | 11/1996 | Reed et al. |
| 5,710,758 A | | 1/1998 | Soliman et al. |
| 5,859,841 A | | 1/1999 | Gitlits |
| 5,915,221 A | * | 6/1999 | Sawyer et al. ............... 455/437 |
| 5,963,867 A | | 10/1999 | Reynolds et al. |
| 5,999,522 A | * | 12/1999 | Rohani ........................ 370/331 |
| 6,002,934 A | | 12/1999 | Boyer et al. |
| 6,014,565 A | * | 1/2000 | Bonta .......................... 455/437 |
| 6,195,551 B1 | * | 2/2001 | Kim et al. ................... 455/437 |

OTHER PUBLICATIONS

William C.Y. Lee, Mobile Cellular Telecommunications: Analog and Digital Systems, 2$^{nd}$ Ed., McGraw–Hill, New York 1995, Chapter 15, pp. 503–533.

H. Sekiguchi, H. Ishikawa, M. Koyama and H. Sawada, Techniques for Increasing Frequency Spectrum Utilization in Mobile Radio Communication System, IEEE, 1985, pp. 26–31.

* cited by examiner

Primary Examiner—Lester G. Kincaid
(74) Attorney, Agent, or Firm—James K. Weixel

(57) ABSTRACT

In a code division multiple access (CDMA) radio communications network (20) having a plurality of cells (24) subdivided into sectors (26), a computer based method (36) and a computing system (34) determine a neighbor list (56) for a selected one of the sectors (26). The sector (26) is subdivided into a plurality of locations (64). For each location (64), a primary pilot channel (88) exhibiting a primary signal quality (92) is distinguished. Secondary pilot channels (120) are identified exhibiting secondary signal qualities (119) within a signal quality threshold window (108) of the primary signal quality (92) of the primary pilot channel. The primary and secondary pilot channels (88 and 120) are included in the neighbor list (56) for the sector (26) as candidate handoff channels (98). The candidate handoff channels (98) are arranged in a ranked order in the neighbor list (56) such that those candidate handoff channels (98) having a higher rank have a greater likelihood for inclusion in a neighbor set of a mobile station (32) residing in the serving area of the sector (26).

22 Claims, 12 Drawing Sheets

| CELL 68 | SECTOR 70 | LOCATION 72 | PILOT CHANNEL 76 | SIGNAL QUALITY (Ec/Io) dB 78 |
|---|---|---|---|---|
| A | 1 | a | A1 | -4 |
|   |   |   | A2 | -26 |
|   |   |   | A3 | -20 |
|   |   |   | B2 | -33 |
|   |   | 30 | B3 | 82  -26 |
|   |   |   | C3 | -38 |
|   |   |   | F2 | -25 |
|   |   |   | F3 | -28 |
|   |   |   | G2 | -10 |
| A | 1 | b | A1 | -4 |
|   |   | 88 | A2 | -6 |
|   |   |   | B2 | -16 |
|   |   |   | B3 | -12 |
|   |   |   | C1 | -21 |
|   |   |   | C3 | -24 |
| A | 1 | c | A1 | -2 |
|   |   |   | A2 | -6 |
|   |   |   | A3 | -7 |
|   |   |   | B2 | -28 |
|   |   |   | B3 | -22 |
|   |   |   | D1 | -33 |
|   |   |   | E1 | -35 |
|   |   |   | G2 | -28 |
|   |   |   | G3 | -25 |
| A | 1 | d | A1 | -5 |
|   |   |   | A2 | -26 |
|   |   |   | A3 | -9 |
|   |   |   | F1 | -28 |
|   |   |   | F2 | -28 |
|   |   |   | G1 | -38 |
|   |   |   | G2 | -25 |
|   |   |   | G3 | -25 |
| A | 2 | a | ... | ... |
| . | . | . | ... | ... |
| . | . | . | ... | ... |
| n | . | . | ... | ... |

FIG. 4

| PILOT CHANNEL | LOCATION DETECTED | HANDOFF STATUS | | |
|---|---|---|---|---|
| | | TWO-WAY | THREE-WAY | SINGLE |
| G2 | A1a | x | | |
| | | | | |
| A3 | A1a | x | | |
| | A1c | x | | |
| | A1d | | | x |
| | | | | |
| A2 | A1b | | x | |
| | A1c | x | | |
| | | | | |
| B2 | A1b | | x | |
| | | | | |
| B3 | A1b | | x | |
| | | | | |

| RADIO COMMUNICATIONS NETWORK NAME : TEST CASE |||||||
|---|---|---|---|---|---|
| TOTAL NUMBER OF CDMA SECTORS = 297 |||||||
| SITE NAME 172 | SECTOR NO. 174 | NEIGHBOR SITE NAME 176 | NEIGHBOR SECTOR NUMBER 178 | TWO-WAY HANDOFF (%) 180 | THREE-WAY HANDOFF (%) 182 |
| 12<sup>TH</sup> ST. | 1 | 12<sup>TH</sup> ST. | 3 | 14.55 | 11.48 |
| | | AVENUE S | 3 | 13.06 | 19.28 |
| | | 12<sup>TH</sup> ST. | 2 | 11.40 | 5.34 |
| | | AVENUE T | 2 | 0.03 | 11.73 |
| | | AVENUE S | 2 | 0.00 | 2.79 |
| | | | | | |
| | | TOTAL PILOTS = 5 | | SINGLE HANDOFF = 10.07% ||
| | | | | | |
| 12<sup>TH</sup> ST. | 2 | 12<sup>TH</sup> ST. | 1 | 13.88 | 12.69 |
| | | AVENUE U | 1 | 9.17 | 14.49 |
| | | 12<sup>TH</sup> ST. | 3 | 7.90 | 6.47 |
| | | AVENUE V | 3 | 2.95 | 9.75 |
| | | AVENUE V | 1 | 0.73 | 8.11 |
| | | AVENUE S | 2 | 0.00 | 1.67 |
| | | | | | |
| | | TOTAL PILOTS = 6 | | SINGLE HANDOFF = 11.14 ||
| 12<sup>TH</sup> ST. | 3 | AVENUE T | 2 | 10.49 | 12.54 |
| | | 12<sup>TH</sup> ST. | 2 | 8.06 | 7.46 |
| | | 12<sup>TH</sup> ST. | 1 | 7.44 | 6.34 |
| | | AVENUE U | 1 | 5.19 | 18.90 |
| | | AVENUE U | 3 | 1.10 | 8.99 |
| | | | | | |
| | | TOTAL PILOTS = 5 | | SINGLE HANDOFF = 13.47 ||
| • | | | | | |
| • | | | | | |
| • | | | | | |

| | | RADIO COMMUNICATIONS NETWORK NAME : TEST CASE | | |
|---|---|---|---|---|
| | | TOTAL NUMBER OF CDMA SECTORS = 297 | | |
| SITE NAME 172 | SECTOR NO. 176 | NEIGHBOR SITE NAME 178 | NEIGHBOR SECTOR NUMBER 180 | TRAFFIC CARRIED, $\Sigma$TWO-WAY+THREE WAY (%) 184 |
| 12TH ST. | 1 | AVENUE S | 3 | 32.34 |
| | | 12TH ST. | 3 | 26.03 |
| | | 12TH ST. | 2 | 16.74 |
| | | AVENUE T | 2 | 12.03 |
| | | AVENUE S | 2 | 2.79 |
| | | | | |
| | | TOTAL PILOTS = 5 | | SINGLE HANDOFF = 10.07% |
| | | | | |
| 12TH ST. | 2 | 12TH ST. | 1 | 26.57 |
| | | AVENUE U | 1 | 23.66 |
| | | 12TH ST. | 3 | 14.37 |
| | | AVENUE V | 3 | 12.70 |
| | | AVENUE V | 1 | 8.84 |
| | | AVENUE S | 2 | 1.67 |
| | | | | |
| | | TOTAL PILOTS = 6 | | SINGLE HANDOFF = 11.14 |
| | | | | |
| 12TH ST. | 3 | AVENUE U | 1 | 24.09 |
| | | AVENUE T | 2 | 23.03 |
| | | 12TH ST. | 2 | 15.52 |
| | | 12TH ST. | 1 | 13.78 |
| | | AVENUE U | 3 | 10.09 |
| | | | | |
| • | | TOTAL PILOTS = 5 | | SINGLE HANDOFF = 13.47 |
| • | | | | |
| • | | | | |

FIG. 11

METHOD AND SYSTEM FOR DETERMINING A NEIGHBOR LIST FOR A CODE DIVISION MULTIPLE ACCESS (CDMA) SECTOR

TECHNICAL FIELD OF THE INVENTION

The present invention relates to the field of radio communications networks. More specifically, the present invention relates to determining neighbor lists for code division multiple access (CDMA) sectors in a radio communications network for use in cellular network planning tools.

BACKGROUND OF THE INVENTION

As cellular communication has become more popular, cellular service providers have felt increasingly pressured to use the cellular radio frequency spectrum as efficiently as possible. Greater efficiency allows a service provider to carry more calls using a given amount of RF spectrum. Code division multiple access (CDMA) is an emerging form of digital cellular service. CDMA is a spread spectrum technology that assigns a unique code to all speech and data bits from a user and transmits the encoded speech bits over the same broad shared frequency spectrum. A receiver demodulates the encoded speech and data signals out of the radio frequency environment and reassembles the speech/data to its original format.

The advantages of CDMA over conventional analog radio communications networks include increased capacity and more efficient use of the radio frequency spectrum. In addition, CDMA technology provides three features that improve system quality. These features include "soft handoff", variable rate vocoding, and multipath signal processing techniques. The soft handoff feature, also known as "make before break", ensures that a call is connected to the destination cell or sector before handoff is completed, thus reducing the probability of a dropped call. The variable rate vocoding feature facilitates speech/data bits to be transmitted at only the rates necessary to ensure high quality signals and only when speech/data is present. The bit rate reduces during silent periods in the conversation, thus conserving the battery power of the mobile station. The multipath signal processing techniques combine power for increased signal integrity and lower required signal levels.

In a CDMA radio communications network, each CDMA base station has associated therewith a pilot channel carried over a coded channel, or code space, of a forward CDMA channel. A pilot channel is an unmodulated, direct-sequence signal broadcast continuously by each CDMA base station. The pilot channel allows a mobile station to acquire the timing of the forward CDMA channel, provides a phase reference for coherent demodulation, and provides a mechanism for making signal strength comparisons between base stations for determining when to request a hand off.

An active mobile station in a CDMA network maintains four sets of pilot channels, an active set, a candidate set, a neighbor set, and the remaining set. The active set includes the pilot channels that the mobile station is currently using for demodulation. The candidate set includes the pilot channels that are not currently in the active set but are received by the mobile station with sufficient pilot signal strength. The neighbor set includes the pilot channels that are not in the active set or the candidate set, but which may become eligible for handoff. The remaining set is the set of all possible assigned pilot channels in the CDMA network, on the same carrier frequency, excluding the pilot channels in the active, candidate, and neighbor sets.

Handoff is a process by which a mobile station conversation is passed from one cell or sector to another cell or sector. Currently, base station equipment allows handoff only with those pilot channels that are present in a neighbor list associated with a CDMA cell or sector of a CDMA cell, and maintained by the switch for the CDMA cell or sector. Thus, a neighbor set for an active mobile station is formed from the neighbor list for the CDMA cell or sector in which the mobile station is currently "residing".

In a CDMA radio communications network, several types of handoff are possible. One such type of handoff is a single handoff. Single handoff occurs when the mobile station is connected to only one CDMA cell or sector. Another type of handoff is a two-way handoff. A two-way handoff could occur in one of two ways, a "softer" handoff or a "soft" handoff. The two-way softer handoff occurs when the mobile station is connected to two sectors of the same co-located cell site. The two-way soft handoff occurs when the mobile station is connected to a sector from each of two different cell sites.

Yet another type of handoff is a three-way handoff. A three-way handoff could occur in one of three ways, a soft/softer handoff, a three-way soft handoff, and a three-way softer handoff. The soft/softer handoff occurs when the mobile station is connected to three sectors of two cell sites, that is, two sectors of one cell site and one sector of the second cell site. A three-way soft handoff occurs when the mobile station is connected to three sectors of three different cell sites, and a three-way softer handoff occurs when the mobile station is connected to three sectors of the same cell site.

In a CDMA network, the single handoff case requires the highest forward link requirement in terms of received signal to noise ratio, $E_b/N_o$. When the mobile station is in a two-way or three-way handoff more than one signal is used in demodulation. Accordingly, the multi-user interference is less and the link requirement for the same quality of service is reduced. The amount of reduction depends on the relative signal strengths of the handoff pilot channels with respect to the current serving pilot channel from the active set and various receiver implementation losses.

In CDMA, a pilot channel from another sector will be included in the demodulation process only if it is included in the neighbor list of the current serving sector. If a pilot channel of sufficient strength from another sector is not included in the neighbor list, then it adds to the interference. The added interference can result in dropped calls, higher frame error rates (FER), and a poorer quality of service. Since pilot channels of sufficient strength that are not in the neighbor list can lead to poor quality of service, it is highly desirable to accurately determine and define the appropriate neighbor list for each CDMA cell or CDMA sector in a CDMA network.

When CDMA cell sites are co-located with analog cell sites, one approach to determining the CDMA neighbor list is to utilize the neighbor lists generated for the analog radio communications network. An analog neighbor list is based on the signal strength of the signals from every sector and the interference at every location. The analog neighbor list is a ranking in terms of the signal strength threshold, such as, carrier-to-interference (C/I) ratio.

An analog system, such as the advanced mobile phone system (AMPS), utilizes different radiofrequencies in adjacent cells or sectors. As such, an analog system employs a "break and make" handoff technique requiring the connection to be broken in the original cell before it is made in the successor cell. Thus, handoff in an analog network desirably utilizes a channel from the analog neighbor list having the greatest C/I ratio. Other channels from the analog neighbor list, for example, the channel in the analog neighbor list having the second greatest C/I ratio, may be considered an interfering signal in an analog system.

Unfortunately, such an analog neighbor list ranked in terms of C/I ratio is undesirable for use as a neighbor list in a CDMA network. An analog neighbor list is undesirable because it does not take into account the various nuances of CDMA, such as the receiver type and its ability to demodulate up to three signals simultaneously. A channel that may be considered to be interfering in an analog system may help the primary pilot channel into a better situation (i.e. a two-way or three-way handoff) in a CDMA system.

Thus, what is needed is a method and system for determining CDMA neighbor lists that advantageously exploit the soft handoff and multipath signal processing features of the CDMA technology.

SUMMARY OF THE INVENTION

Accordingly, it is an advantage of the present invention that a method and system for determining a neighbor list for a code division multiple access (CDMA) sector in a radio communication network are provided.

It is another advantage of the present invention that the method and system take into account the underlying CDMA network performance and substantially each possible mobile station location.

Yet another advantage of the present invention is that candidate handoff channels in the neighbor list of the CDMA sector are ranked such that candidate handoff channels having a higher rank have a greater likelihood of being selected for inclusion in the neighbor set of a mobile station.

The above and other advantages of the present invention are carried out in one form by a computer-based method of determining a neighbor list for a code division multiple access (CDMA) sector in a radio communications network, the network further including neighbor CDMA sectors proximate the CDMA sector. The method calls for detecting, at locations in the CDMA sector, neighbor broadcast channels transmitted from the neighbor CDMA sectors. For each of the locations, a first broadcast channel is distinguished from the neighbor broadcast channels detected at the location. For each location, a signal quality threshold window is established in response to a signal quality of the first broadcast channel. Second broadcast channels are identified from the neighbor broadcast channels, each of the second broadcast channels is identified when a signal quality of each second broadcast channel is within the signal quality threshold window. The first and second broadcast channels are included as candidate handoff channels in the neighbor list for the CDMA sector.

The above and other advantages of the present invention are carried out in another form by a computing system for determining neighbor lists for each of a plurality of code division multiple access (CDMA) sectors in a radio communication network. The neighbor lists are utilized to form neighbor sets of candidate handoff channels for mobile stations residing in associated ones of the CDMA sectors. The computing system includes an input element for receiving a pilot channel detection database for the radio communications network. The database includes a plurality of locations for each of the CDMA sectors and pilot channels transmitted from the CDMA sectors and detected at corresponding ones of the locations. A processor, in communication with the input element, creates the neighbor lists of the candidate handoff channels from the pilot channels in the pilot channel detection database, one each of the neighbor lists corresponding to one each of the CDMA sectors. A memory element, in communication with the processor, stores the neighbor lists for the CDMA sectors, the candidate handoff channels in each of the neighbor lists being arranged in a ranked order. The ranked order establishes a likelihood for the neighbor pilot channels to be selected for inclusion in the neighbor sets.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 4 shows an exemplary table of a portion of a pilot channel detection database;

FIG. 6 shows an exemplary table of a compilation of statistics updated through the execution of the neighbor list determination process;

FIG. 10 shows an exemplary neighbor list record of three neighbor lists for three sectors formed in response to the execution of the neighbor list determination process of FIG. 3; and FIG. 11 shows an exemplary neighbor list record in which the candidate handoff pilot channels of FIG. 10 are placed in a ranked order according to a percentage of traffic carried.

DETAILED DESCRIPTION OF THE PREFERRED EMBODIMENTS

Figure 1:
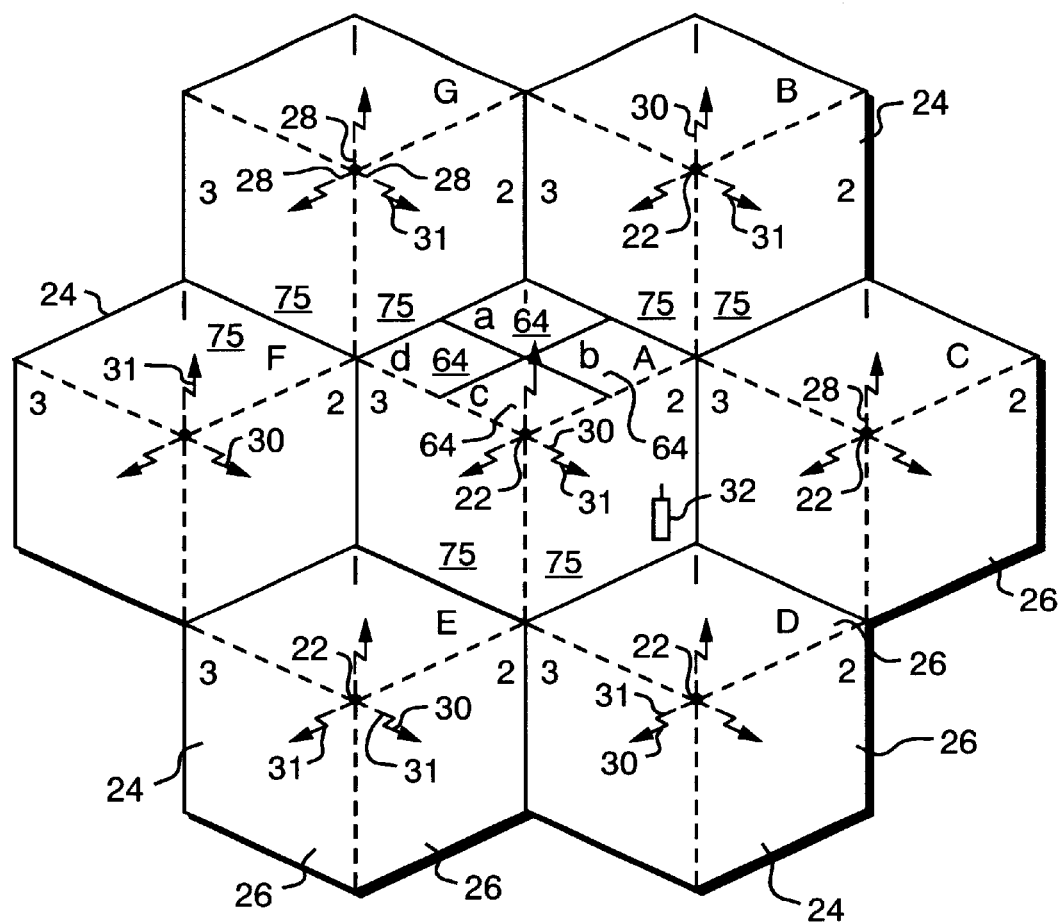
FIG. 1 shows a schematic layout diagram of a radio communications network.

FIG. 1 shows a schematic layout diagram of a radio communications network 20. In a preferred embodiment, network 20 is implemented using a spread spectrum digital service, such as code division multiple access (CDMA). CDMA network 20 may be implemented as the sole radio communication service in a given area. Alternatively, CDMA network 20 may be combined in a dual-mode implementation with an analog service, such as the advanced mobile phone system (AMPS).

Network 20 includes a number of cell sites 22. Each cell site 22 controls at least one cell 24 or a sector 26 of cell 24. In other words, cells 24 represent the geographic radio coverage areas of cell sites 22. Cell sites 22 may couple to mobile telephone switching offices (not shown) in a manner well known in the art. Cells 24 are shown as being generally hexagonal in shape. This hexagonal representation is convenient for schematically denoting a cell's radio coverage area. Those skilled in the art will appreciate that the actual shape and size of cells 24 will vary from cell to cell.

Network 20 is shown with only seven of cells 24 for clarity of illustration. Those skilled in the art will recognize that a conventional radio communication network can include many more cells 24. In addition, each of cells 24 is shown subdivided into three of sectors 26 for clarity of illustration. However, all cells in a radio communications network need not be subdivided into sectors. Furthermore, a cell may be subdivided into a number other than three of sectors 26. Alternatively, the radio communications network may not include any sectored cells.

For cells 24 divided into sectors 26, cell sites 22 are represented by sector servers 28. By convention, each sector 26 of a sectored one of cells 24 is served by a directional antenna (not shown), as well as associated transmit and receive circuitry (not shown). The directional antenna and the associated transmit and receive circuitry form one of sector servers 28. Thus, the "sector server" nomenclature used herein indicates the elements of cell sites 22 dedicated to providing radio coverage service in a particular one of sectors 26. Likewise, the "sector" nomenclature used herein indicates a radio coverage area of a portion of a cell, in the case of a sectored cell. Furthermore, the "sector" nomenclature used herein also refers to an entire radio coverage area of a cell that is not sectored.

In CDMA network 20, each of sector servers 28 transmits a broadcast, or pilot, channel 30 over a forward CDMA link 31. As discussed previously, pilot channel 30 is an unmodulated, direct-sequence signal broadcast continuously by each of sector servers 28. Typically, forward CDMA link 31 contains sixty-four code channels. Certain code channels are assigned to different logic channels. By convention, pilot channels 30 are assigned to code channel zero. The remaining code channels of forward CDMA link 31 may be dedicated as paging channels, a sync channel, or traffic channels.

Pilot channels 30 are utilized by a mobile station 32 to identify one of sector servers 28 to which one of pilot channels 30 is assigned. In addition, mobile station 32 utilizes pilot channels 30 to acquire the timing of forward CDMA link 31, provide a phase reference for coherent demodulation, and provide a mechanism for making signal strength comparisons between base stations for determining when to hand off call traffic.

Mobile station 32 is a digital radio communication unit configured to encode speech or data bits for transmission according to CDMA methodology. Likewise, mobile station 32 is configured to receive encoded speech or data signals out of the radio frequency environment and reassemble the signal into its original format in accordance with CDMA methodology. Only one mobile station 32 is shown in CDMA network 20 for clarity of illustration. It should be readily apparent that a radio communications network will include many more mobile stations 32.

Automated approaches to analog and digital network planning are being developed to assist service providers in devising channel assignment plans for cellular networks, such as CDMA network 20. Some automated network planning tools involve simulating the actual radio communications network to predict the propagation of radio frequency (RF) signals in order to define the radio coverage areas for base stations, to characterize potential interference within a simulated environment in order to effectively perform frequency planning, to perform hand-off analysis for the determination of neighbor lists, and so forth.

In CDMA, the system performance is defined by both the forward CDMA link and the reverse CDMA link. The forward CDMA link is the dominant link in that most of the information on timing and synchronization occurs on this link. However, the amount of traffic that can be supported depends on both links because the requirements of both links are to be satisfied in order for communication to be established. Consequently, a CDMA network planning tool desirably evaluates the system performance of both the forward and reverse CDMA links.

In a CDMA network planning tool, the quantities calculated during reverse link analysis that may be used to assess the actual reverse link system performance include the reverse link margin and the supported in-cell traffic load per sector. Other quantities, such as the noise floor elevation, the frequency reuse efficiency, and the percentage of pole capacity, may be calculated during reverse link analysis to evaluate the network design and identify problematic sectors include.

In a CDMA network planning tool, the forward link analysis is usually performed following the reverse link analysis. The object of forward link analysis is to estimate the average sector transmit power necessary to carry the offered traffic at a certain performance level specified by the network planner. This average sector transmit power may be used to estimate forward margins, handoff statistics, interference margins, and so forth in the CDMA network. Accurate estimates can enable a network planner to minimize interference and provide a high quality of service.

Neighbor lists (discussed below) are stored at each of sector servers 28. A neighbor list for a current serving sector includes pilot channels from other sectors which may be included in demodulation at the receiver of the mobile station. A mobile station residing in the current serving sector obtains its corresponding neighbor set of pilot channels from the neighbor list for the current serving sector. The mobile station measures and reports to a sector server the strengths of received pilot channels. In response, the associated sector servers send direction messages to the mobile station directing it to move a particular pilot channel to a particular one of the active, candidate, neighbor, and remaining sets maintained at the mobile station.

In order to more accurately estimate the average sector transmit power in the CDMA network planning tool, the neighbor list for a selected sector should desirably be considered during forward CDMA link analysis. One such strategy in CDMA network modeling is to calculate a neighbor list representing an "optimum" list for each sector.

The present invention is implemented in an automated network planning tool to determine neighbor lists for each of sectors 26 in CDMA network 20. Each neighbor list may be stored at an associated one of sector servers 28. The neighbor list provides a list of candidate handoff channels (discussed below) from which a neighbor set may be created for mobile station 32 residing in one of sectors 26 of CDMA network 20.

Figure 2:
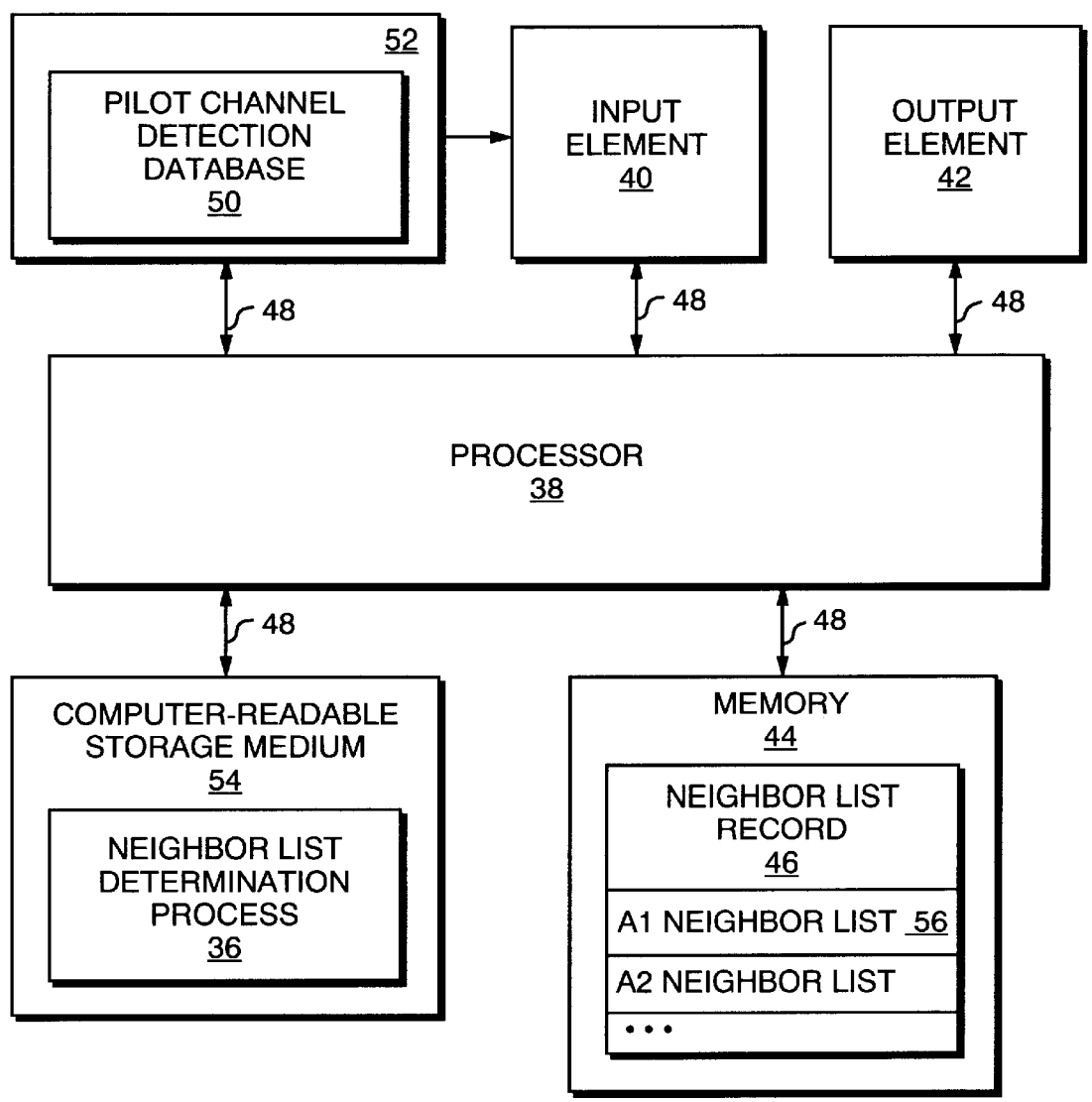
FIG. 2 shows a simplified block diagram of a computing system for executing a neighbor list determination process.

FIG. 2 shows a simplified block diagram of a computing system 34 for executing a neighbor list determination process 36. System 34 includes a processor 38 on which the methods according to the invention can be practiced. Processor 38 is in communication with an input element 40, an output element 42 and a memory system 44 having recorded therein a neighbor list record 46 generated in response to the execution of neighbor list determination process 36. These elements are interconnected by a bus structure 48.

Input element 40 can encompass a keyboard, mouse, pointing device, audio device (e.g., a microphone), or any other device providing user-provided input to processor 38. In addition, input element 40 also encompasses a data reader for reading data, such as a pilot channel detection database 50 from a storage device 52 and providing database 50 to processor 38. The data reader may include a hard disk drive internal or external to processor 38, a tape drive, floppy disk drive, CDROM, or a combination thereof. Storage device 52 may be a hard disk, floppy disk, a compact disk, a personal computer memory card international association (PCMCIA) card, and the like.

Output element 42 can encompass a display, a printer, an audio device (e.g., a speaker), or other devices providing output from processor 38. Input and output devices 40 and 42 can also include network connections, modems, or other devices used for communications with other computer systems or devices.

Computing system 34 also includes a computer-readable storage medium 54. Computer-readable storage medium 54 may be a magnetic disk, compact disk, or any other volatile or non-volatile mass storage system readable by processor 38. Computer-readable storage medium 54 may also include cooperating or interconnected computer readable media, which exist exclusively on computing system 34 or are distributed among multiple interconnected computer systems (not shown) that may be local or remote.

Neighbor list determination process 36 is executable code recorded on computer-readable storage medium 54 for instructing processor 38 to create neighbor list record 46. Neighbor list record 46 includes neighbor lists 56 for each of CDMA sectors 26 generated through the execution of neighbor list determination process 36. Neighbor lists 56 are subsequently stored at their associated sector server 28 (FIG. 1) to be used to form neighbor sets (not shown) for mobile station 32 (FIG. 1).

Figure 3A:
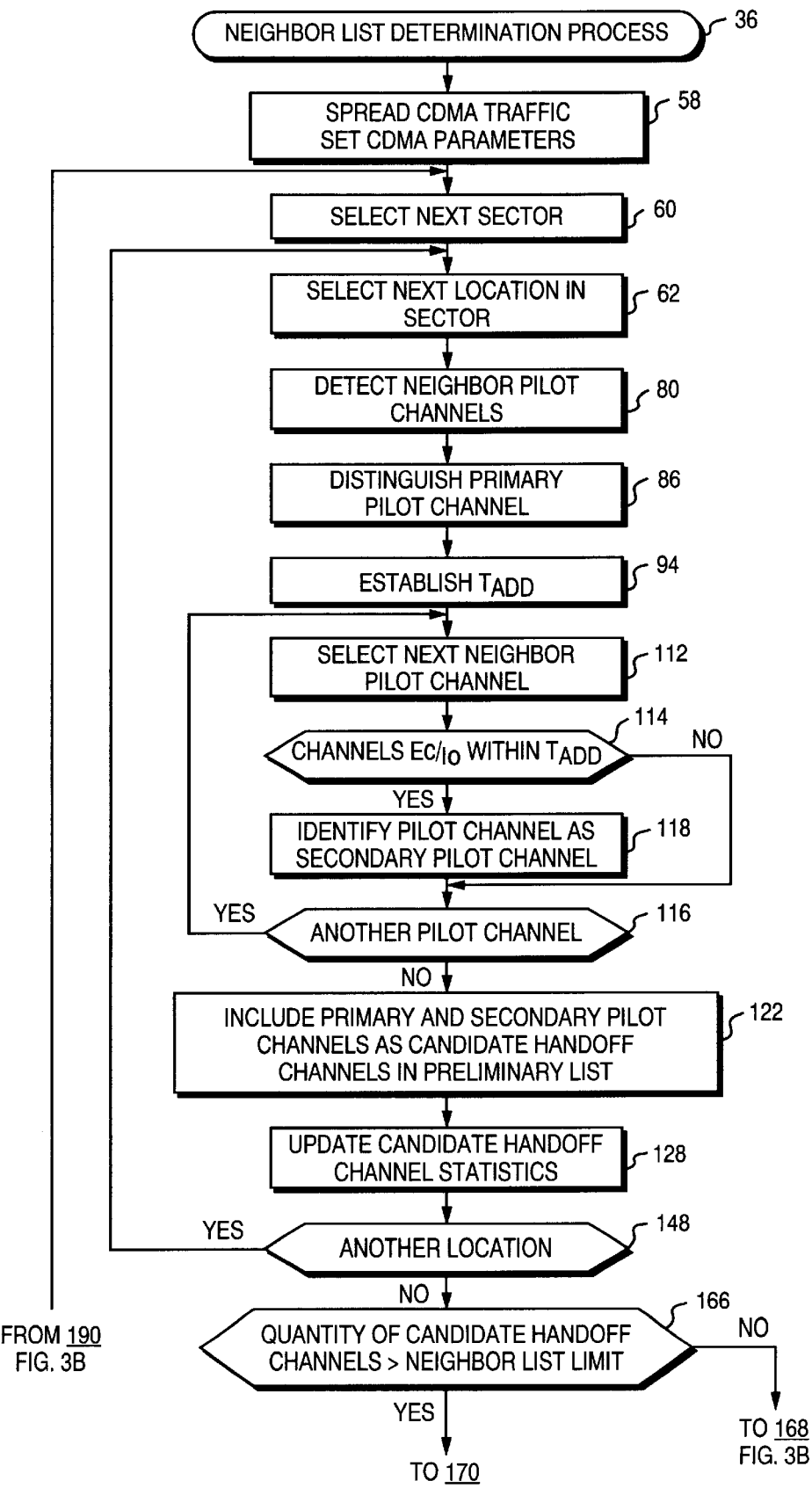
FIG. 3 shows a flow chart of the neighbor list determination process indicated in FIG. 2.
Figure 3B:
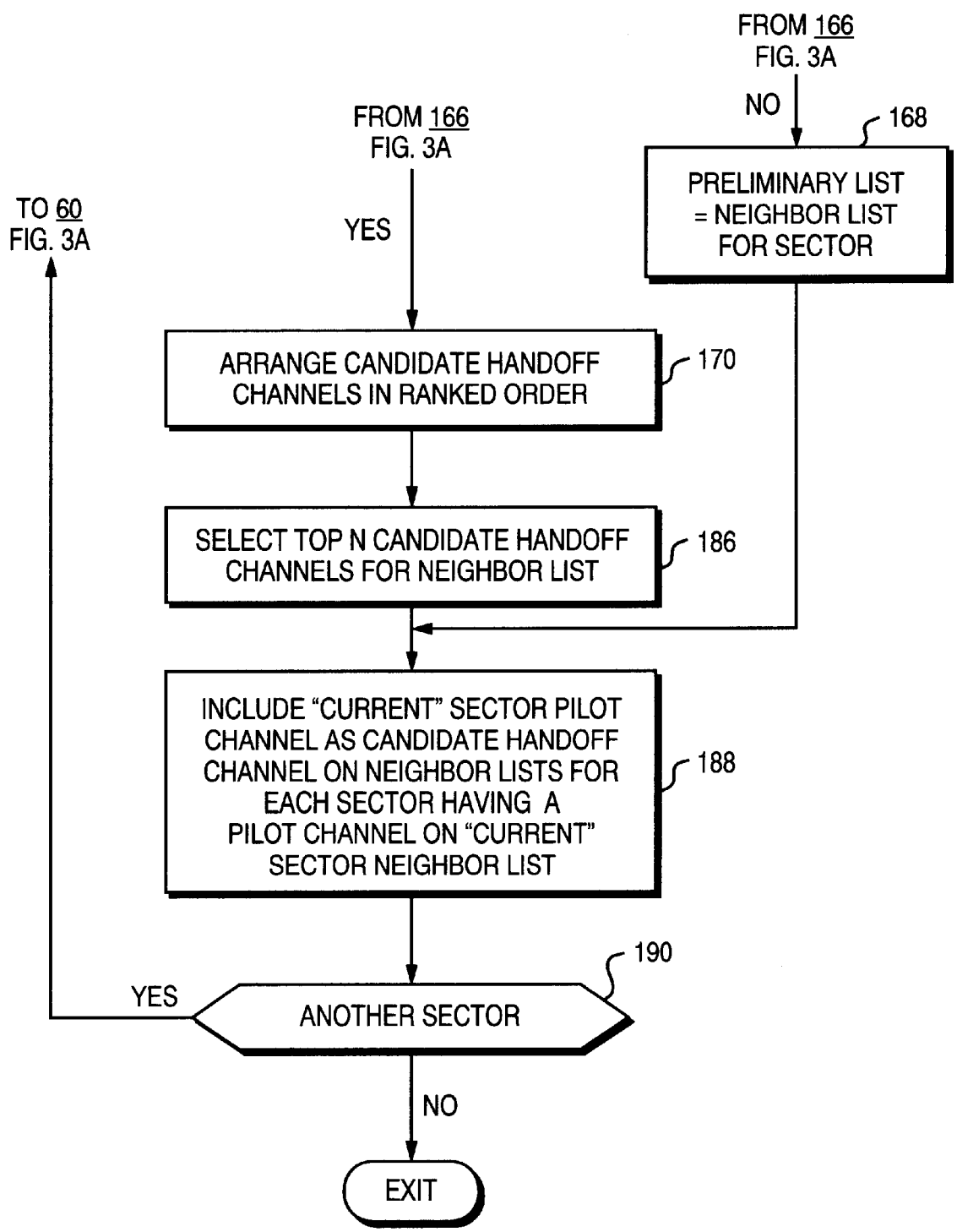

FIG. 3 shows a flow chart of neighbor list determination process 36. Neighbor list determination process 36 is executed by processor 38 to form neighbor lists 56 (FIG. 3) for each of CDMA sectors 26 (FIG. 1) that advantageously exploit the soft handoff and multipath signal processing features of the CDMA technology employed in radio communications network 20 (FIG. 1).

Process 36 begins with a task 58. At task 58, processor 38 (FIG. 2) performs system initialization tasks. Since process 36 is implemented in a network planning tool (not shown), task 58 causes processor 38 to model CDMA network 20 (FIG. 1) by spreading CDMA traffic and setting CDMA related parameters, such as assigned pilot channels 30 (FIG. 1), handoff requirements, and so forth. For example, processor 38 receives traffic information at each of locations 64, radio propagation modeling predictions, and CDMA parameters set by the user or stored in an offline database (not shown), and determines for each of locations 64, the list of CDMA sector servers 28 (FIG. 1), the amount of interference, the total received power, and the amount of CDMA traffic. This information is subsequently compiled to form pilot channel detection database 50, which will be utilized in subsequent tasks.

Following task 58, a task 60 is performed. At task 60, processor 38 accesses pilot channel detection database 50 and selects the next sector for evaluation. Of course, during a first iteration of process 36, the "next" sector will the first sector of CDMA network 20 (FIG. 1) to be evaluated. For example, at task 60, processor 38 may identify the "next" sector to be selected from cell 24 (FIG. 1), labeled "A", and one of sectors 26 (FIG. 1) of cell "A", the sector being labeled "1".

In response to task 60, a task 62 is performed. At task 62, processor 38 selects the next location for evaluation. Referring momentarily to FIG. 1, in the model of CDMA network 20, each of sectors 26 is divided into a plurality of locations 64. Locations 64 refer to a unit of area within the actual CDMA network environment in which mobile station 32 (FIG. 1) may reside. As will become readily apparent, process 36 evaluates each of locations 64 within each of sectors 26 of network 20. Only one of sectors 26 is shown divided into four of locations 64 for clarity of illustration. However, each of sectors 26 of network 20 may be divided into many more of locations 64 for more detailed analysis.

During a first iteration of process 36, the "next" location will the first of locations 64 to be evaluated. For example, at task 60, processor 38 selected sector 26, labeled "1", from cell 24, labeled "A". Thus, the "next" one of locations 64 to be selected may be location 64, labeled "a".

FIG. 4 shows an exemplary table 66 of a portion of pilot channel detection database 50. Table 66 includes a cell field 68, identifying one of cells 24 (FIG. 1), a sector field 70, identifying one of sectors 26 (FIG. 1) associated with a particular one of cells 24, and a location field 72, identifying one of locations 64 (FIG. 1) associated with a particular one of cells 24 and sectors 26. For example, a first entry 74 includes cell "A", sector "1" of cell "A", and location "a" of cell "A", sector "1". The execution of tasks 60 and 62 (FIG. 3) of subprocess 36 (FIG. 3) results in the selection of one of locations 64, described hereinafter as location "A1a". The others of sectors 26 located proximate cell "A", sector "1" are described hereinafter as neighbor sectors 75 (FIG. 1).

Table 66 further includes a pilot channel field 76, identifying pilot channels 30 and a signal quality, $E_c/I_o$, field 78 (discussed below). In a preferred embodiment, signal quality corresponds to the $E_c/I_o$, which is an indicator of the quality of service that the mobile station can expect to receive. $E_c$ indicates the useful user signal energy per bit of the pilot channel and $I_o$ indicates the interfering power spectral density. Although signal quality is described in terms of $E_c/I_o$, it should be apparent to those skilled in the art that other measures of signal quality may be employed. Other measures include, for example, a signal strength measurement, bit error rate, frame error rate, and so forth.

Table 66 only shows entries for cell "A", sector "1". Ellipsis are included in table 66 to indicate that database 50 includes more entries corresponding to each of locations 64 (FIG. 1), in each of sectors 26 (FIG. 1), in each of cells 24 (FIG. 1).

Referring back to process 36 (FIG. 3) in connection with table 66, following task 62, a task 80 is performed. At task 80, processor 38 (FIG. 2) refers to pilot channel field 76 to detect neighbor pilot channels 82 for the selected one of locations 64. Referring to first entry 74, a serving pilot channel 84, labeled "A1", is the one of pilot channels 30 being transmitted from sector server 28 associated with cell "A", sector "1". Neighbor pilot channels 82 are those of pilot channels 30 (FIG. 1) that are detected at location "A1a", with the exclusion of serving pilot channel 84. Thus, neighbor pilot channels 82 are neighbor broadcast channels transmitted from sector servers 28 (FIG. 1) of neighbor sectors 75 (FIG. 1). Accordingly, at task 80 processor 38 detects neighbor pilot channels 82, labeled A2, A3, B2, B3, C2, F3, and G2, at a first one of locations 64, labeled A1a.

With continued reference to FIGS. 3–4, in response to task 80, a task 86 is performed. At task 86, processor 38 (FIG. 2) distinguishes a first broadcast channel, primary pilot channel 88, from one of neighbor pilot channels 82. Primary pilot channel 88 is the one of neighbor pilot channels 82 exhibiting the greatest signal quality 90, in terms of $E_c/I_o$, provided in signal quality field 78. Referring to signal quality threshold field 78, neighbor pilot channel 82, labeled G2, exhibits a primary signal quality 92, with an $E_c/I_o$ of −10 dB, which is greater than signal qualities 90 for the remaining ones of neighbor pilot channels 82. Accordingly, neighbor pilot channel, G2, 82 is distinguished as primary pilot channel 88.

Referring to FIG. 3, following distinguishing task 86 of process 36, a task 94 is performed. At task 94, processor 38 (FIG. 2) establishes a signal quality threshold window, $T_{ADD}$, set in task 58 for the sector selected in task 60. The signal quality threshold window defines a minimum signal quality relative to primary signal quality 92 over which signal qualities 90 of neighbor pilot signals 82 must exceed to be considered for inclusion in neighbor list 56 (FIG. 2) for cell A, sector 1.

Figure 5:
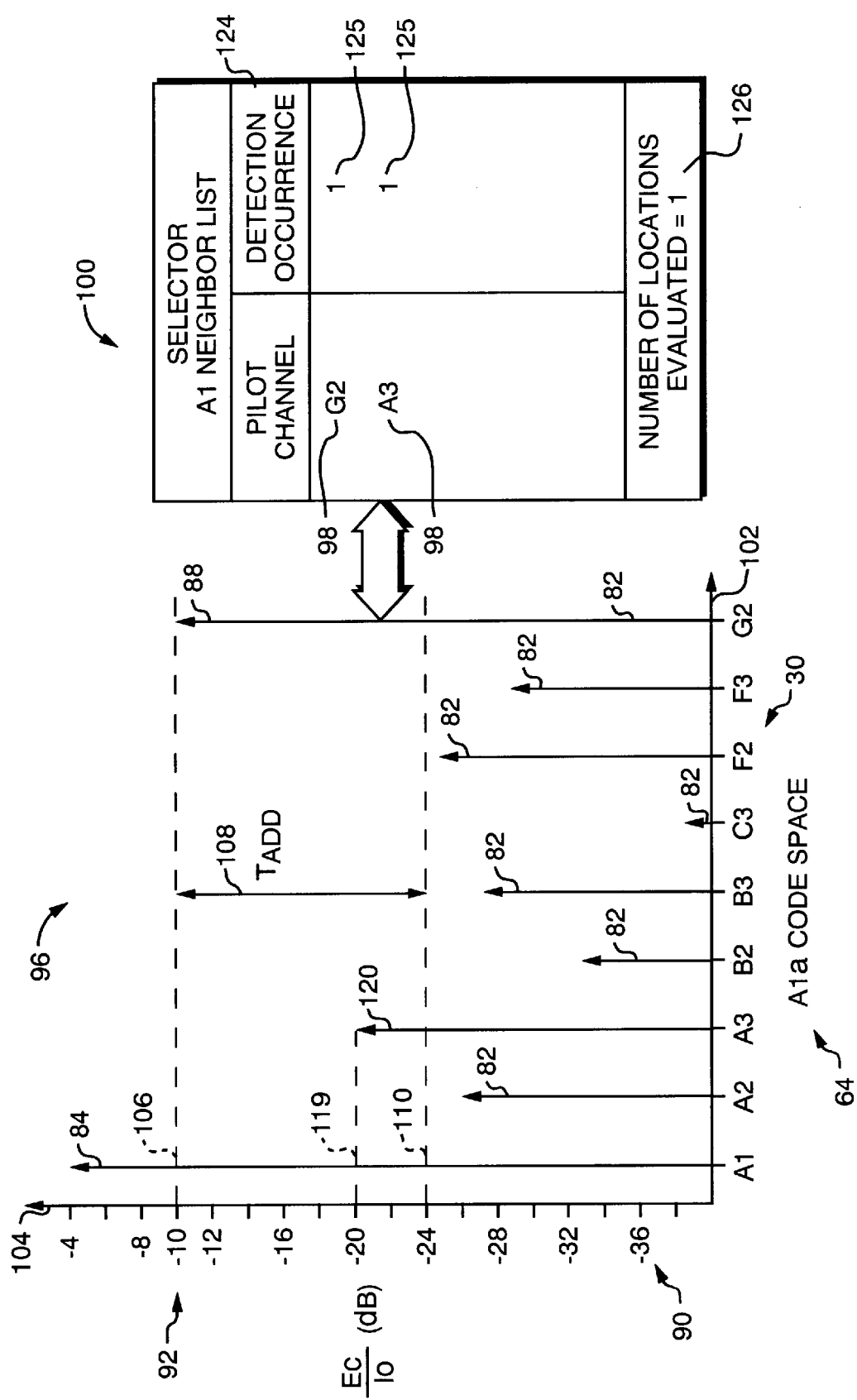
FIG. 5 shows a graph exemplifying the addition of candidate handoff pilot channels for a first location in a preliminary neighbor list.

Referring to FIG. 5 in connection with FIG. 3, FIG. 5 shows a graph 96 exemplifying the addition of candidate handoff channels 98 for first location, A1a, 64 in a preliminary neighbor list 100. An abscissa 102 of graph 96 shows pilot channels 30 detected at first location, A1a, 64. An ordinate 104 of graph 96 shows signal qualities 90 of each of pilot channels 30.

Through the execution of task 94, a maximum value 106 of a signal quality threshold window, $T_{ADD}$, 108 is set to be substantially equivalent to primary signal quality 92, that is an $E_c/I_o$ of −10 dB. In a preferred embodiment, the width of window 108 is −14 dB. Accordingly, a minimum value 110 of signal quality threshold window is approximately −24 dB. Although, the width of window 108 is set to −14 dB in this exemplary scenario, window 108 may be set wider or narrower to optimize the inclusion of candidate handoff channels 98 in preliminary neighbor list 100.

Following task 94, a task 112 is performed. Task 112 causes processor 38 (FIG. 2) to select the next neighbor pilot channel 82 from database 50 (FIG. 4) for evaluation. Of course, during a first iteration of task 112, the "next" neighbor pilot channel 82 will be the first neighbor pilot channel 82 detected at first location, A1a, 64 to be evaluated. For example, processor 38 may select neighbor pilot channel 82, labeled A2, from database 50. Following task 112, a query task 114 is performed.

At query task 114, processor 38 (FIG. 2) determines if signal quality 90 for the selected neighbor pilot channel 82, is within signal quality threshold window 108. When signal quality 90 is not within window 108, process 36 proceeds to a query task 116. For example, the selected neighbor pilot channel 82, labeled A2, exhibits signal quality 90 of approximately −26 dB which does not fall within window 108. Accordingly, process 36 proceeds to query task 116.

At query task 116, processor 38 determines if there is another one of neighbor pilot channels 82 to be evaluated for first location, A1a, 64. When there is another one of neighbor pilot channels 82, process 36 loops back to task 112 to select the next one of neighbor pilot channels 82 and evaluate its signal quality.

When query task 114 determines that signal quality 90 of the selected one of neighbor pilot channels 82 does fall within signal quality threshold window 108, process 36 proceeds to a task 118. At task 118, the selected neighbor pilot channel 82 is identified as a second broadcast channel, or a secondary pilot channel 120. For example, as shown in graph 96, neighbor pilot channel 82, labeled A3, exhibits a secondary signal quality 119 of approximately −20 dB which falls within window 108. Accordingly neighbor pilot channel 82, labeled A3, is identified as secondary pilot channel 120. Following task 118, process 36 proceeds to query task 116 to determine if there is another one of neighbor pilot channels 82 to be evaluated for first location, A1a, 64.

When task 116 determines that there are no more of neighbor pilot channels 82 to be evaluated, process 36 proceeds to a task 122. For example, when signal qualities 90 of neighbor pilot channels 82, labeled A2, A3, B2, B3, C3, F2, and F3, have been compared against primary signal quality 92 of primary pilot channel 88, task 122 is performed.

At task 122, primary pilot channel 88 and any identified secondary pilot channels 120 are included as candidate handoff channels 98 in preliminary neighbor list 100. Preliminary neighbor list 100 also maintains a detection occurrence counter 124 for each of candidate handoff channel 98, and a total count 126 of the number of locations 64 evaluated for the selected one of sectors 26. Accordingly, preliminary neighbor list shows detection occurrences 125 for each of candidate handoff channels 98, labeled G2 and A3, equivalent to one, and total count 126 equivalent to one.

With reference back to FIG. 3, following task 122, a task 128 is performed. At task 128, processor 38 (FIG. 2) updates statistics for candidate handoff channels 98 (FIG. 5). In an exemplary embodiment, the statistics include a compilation of the locations 64 in which a particular candidate handoff channel 98 is detected and the handoff status at each of the locations. Other statistics can include erlang traffic carried, strength relative to the primary pilot channel, and so forth. The statistics will subsequently be used to place candidate handoff channels 98 in a ranked order (discussed below). The ranked order of candidate handoff channels is utilized if the number of candidate handoff channels in preliminary list 100 exceeds a predetermined limit of candidate handoff channels to be included in neighbor list 56 (FIG. 2), discussed below.

FIG. 6 shows an exemplary table 130 of a compilation of statistics updated through the execution of task 128 (FIG. 3) of neighbor list determination process 36 (FIG. 3). Table 130 includes a candidate handoff channel field 132, a location detected field 134, and a handoff status field 136. Handoff status field includes a two-way handoff subfield 138, a three-way hand-off subfield 140, and a single handoff subfield 142. In this exemplary table 130, the statistic of interest is the type of handoff scenario and frequency of that particular handoff scenario for each of candidate handoff channels 98.

For example, a first entry 144 for candidate handoff channel 98, labeled G2, and a second entry 146 for candidate handoff channel 98, labeled A3, are created at task 128. First entry 144 shows candidate handoff channel, G2, 98 in channel field 132, first location, A1a, 64 in location detected field 134, and an "X" in two-way handoff subfield 136 of handoff status field 136. Likewise, second entry 146 shows candidate handoff channel, A3, 98 in channel field 132, first location, A1a, 64 in location detected field 134, and an "X" in two-way handoff subfield 136 of handoff status field 136.

The "X" in each of first and second entries 144 and 146 indicates that candidate handoff channels 98, labeled G2 and A3, are eligible for two-way handoff at first location, A1a, 64. In other words, candidate handoff channels 98, G2 and A3, form a channel pair for performing two-way handoff. Referring momentarily to FIG. 5, this is illustrated in graph 96 by the presence of only one secondary pilot channel 120, labeled A3, exhibiting secondary signal quality 119 that falls within signal quality threshold window 108 defined by primary signal quality 92 of primary pilot channel 88, labeled G2.

If there were no secondary pilot channels 120 exhibiting a secondary signal quality 119 falling within signal quality threshold window, primary pilot channel 88 is eligible for single handoff only. Alternatively, if there were two or more secondary pilot channels 120 exhibiting secondary signal qualities 119 falling within signal quality threshold window, primary pilot channel 88 would be eligible for three-way handoff.

In a preferred embodiment, the statistics compiled in exemplary table 130 are updated for each of candidate handoff channels 98 in terms of detection occurrences, shown as identified locations in location detected field 134, and handoff status. However, this same data, i.e. detection occurrences 125 (FIG. 5) shown in preliminary neighbor list 100 (FIG. 5), and handoff status 136, may be manipulated to represent candidate handoff channels 98 in terms of erlang traffic carried (discussed below), secondary signal quality 119 relative to primary signal quality 92, and so forth. In addition, although shown as separate entities for clarity of illustration, the compilation of statistics in table 130 may be combined with preliminary list 100 in a single database.

Referring back to FIG. 3, following task 128, a query task 148 is performed. At task 148, processor 38 determines if there is another one of locations 64 (FIG. 1) in the selected one of sectors 26 (FIG. 1) to be evaluated. When there is another one of locations 64, process 36 loops back to task 62 to select the next one of locations 64. In the exemplary scenario shown in FIG. 1, sector 26, labeled 1, of cell 24, labeled A, includes four locations 64. Thus, each of locations 64 is evaluated to distinguish primary pilot channel 88 for that location 64 and identify any secondary pilot channels 120.

Figure 7:
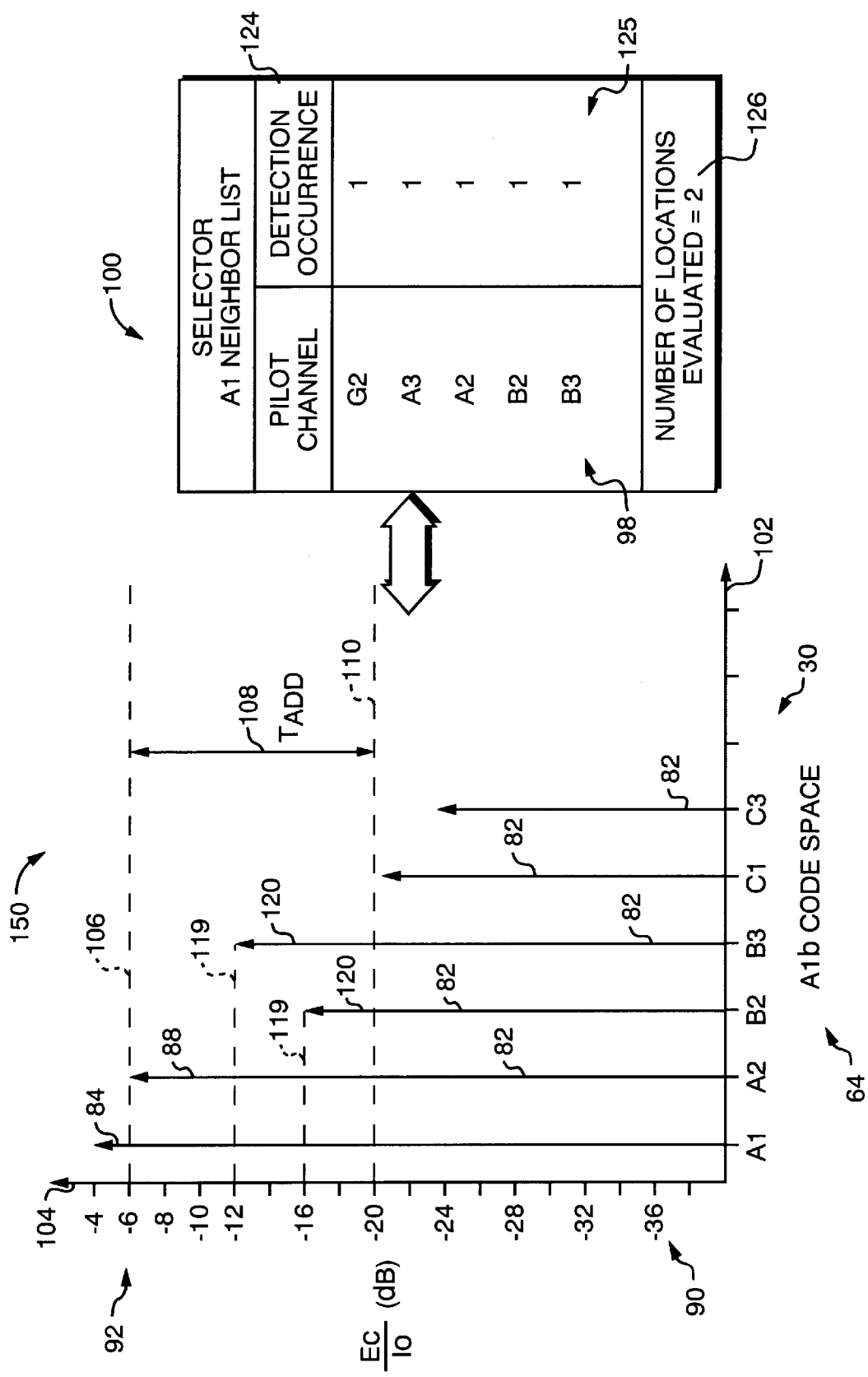
FIG. 7 shows a graph exemplifying the addition of candidate handoff pilot channels for a second location in the preliminary neighbor list.

FIG. 7 shows a graph 150 exemplifying the addition of candidate handoff channels 98, labeled A2, B2, and B3, for a second location, A1b, 64 in preliminary neighbor list 100. Candidate handoff channels 98, A2, B2, and B3, are included in preliminary neighbor list during a second iteration of tasks 62, 80, 86, 94, 112, 114, 118, 116, 122, and 128.

In the exemplary scenario shown in graph 150, primary pilot channel 88, labeled A2, exhibits a primary signal quality 92 with an $E_c/I_o$ of −6 dB. Signal quality threshold window 108 is established having maximum value 106 substantially equivalent to primary signal quality 92, a width of approximately −14 dB, and minimum value 110 substantially equivalent to an $E_c/I_o$ of −20 dB.

FIG. 7 also shows that candidate handoff channels 98, A2, B2, and B3 are eligible for three-way handoff at second location, A1b, 64. In other words, there is more than one secondary pilot channel 120 exhibiting secondary signal qualities 119 that fall within signal quality threshold window 108. In particular, two secondary pilot channels 120, labeled B2 and B3, exhibit secondary signal qualities 119 that fall within signal quality threshold window 108 defined by primary signal quality 92 of primary pilot channel 88, labeled A2. Thus, candidate handoff channels 98, A2, B2, and B3, form a channel trio for performing three-way handoff.

Referring, momentarily to table 130 (FIG. 6), a third entry 152, a fourth entry 154, and a fifth entry 156 exemplify the updated statistics for candidate handoff channels 98 (A2, B2, and B3). An "X" is shown in three-way handoff subfield 140 for each of third, fourth, and fifth entries, 152, 154, and 156 respectively, indicating that each of candidate handoff channels 98 (A2, B2, and B3) form a channel trio for performing three-way handoff at location, A1b, 64.

Figure 8:
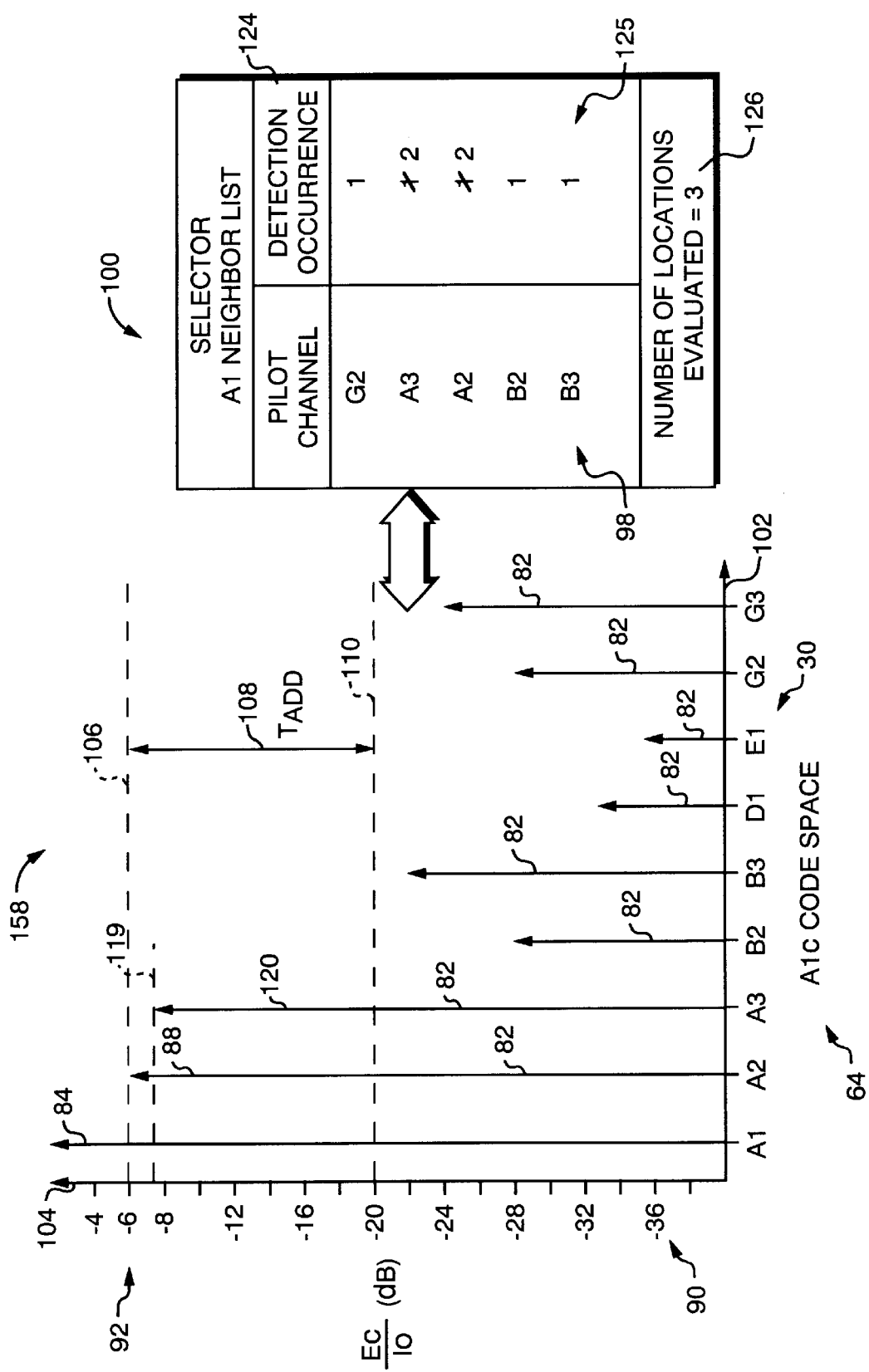
FIG. 8 shows a graph exemplifying a detection occurrence counter being incremented in the preliminary neighbor list in response to the detection of candidate handoff pilot channels in a third location.

FIG. 8 shows a graph 158 exemplifying detection occurrence counter 124 being incremented in preliminary neighbor list 100 in response to the detection of candidate handoff channels 98, labeled A3 and A2, in a third location, A1c, 64. Candidate handoff channels 98, A3, and A2, were previously included in preliminary neighbor list 100. Accordingly, their associated detection occurrences 125 in detection occurrence counter 124 are incremented from one to two in response to their detection in third location, A1c, 64 during a third iteration of tasks 62, 80, 86, 94, 112, 114, 118, 116, 122, and 128.

In the exemplary scenario shown in graph 158, primary pilot channel 88, labeled A2, exhibits a primary signal quality 92, $E_c/I_o$ of −6 dB. Signal quality threshold window 108 is established having maximum value 106 substantially equivalent to primary signal quality 92, a width of approximately −14 dB, and minimum value 110 substantially equivalent to an $E_c/I_o$ of −20 dB.

FIG. 8 also shows that there is only one of secondary handoff channels, namely candidate handoff channel 98, labeled A3, exhibiting a secondary signal quality 119 that falls within signal quality threshold window 108. As such, candidate handoff channels 98, labeled A2 and A3, form a channel pair that is eligible for two-way handoff at third location, A1c, 64. Referring to table 130 (FIG. 6), a sixth entry 160 and a seventh entry 162 exemplify the updated statistics for candidate handoff channels 98 (A2 and A3). An "X" is shown in two-way handoff subfield 138 for each of sixth and seventh entries 160 and 162, respectively, indicating that candidate handoff channels 98 (A3 and A2) form a channel pair for performing two-way handoff at location, A1c 64.

Figure 9:
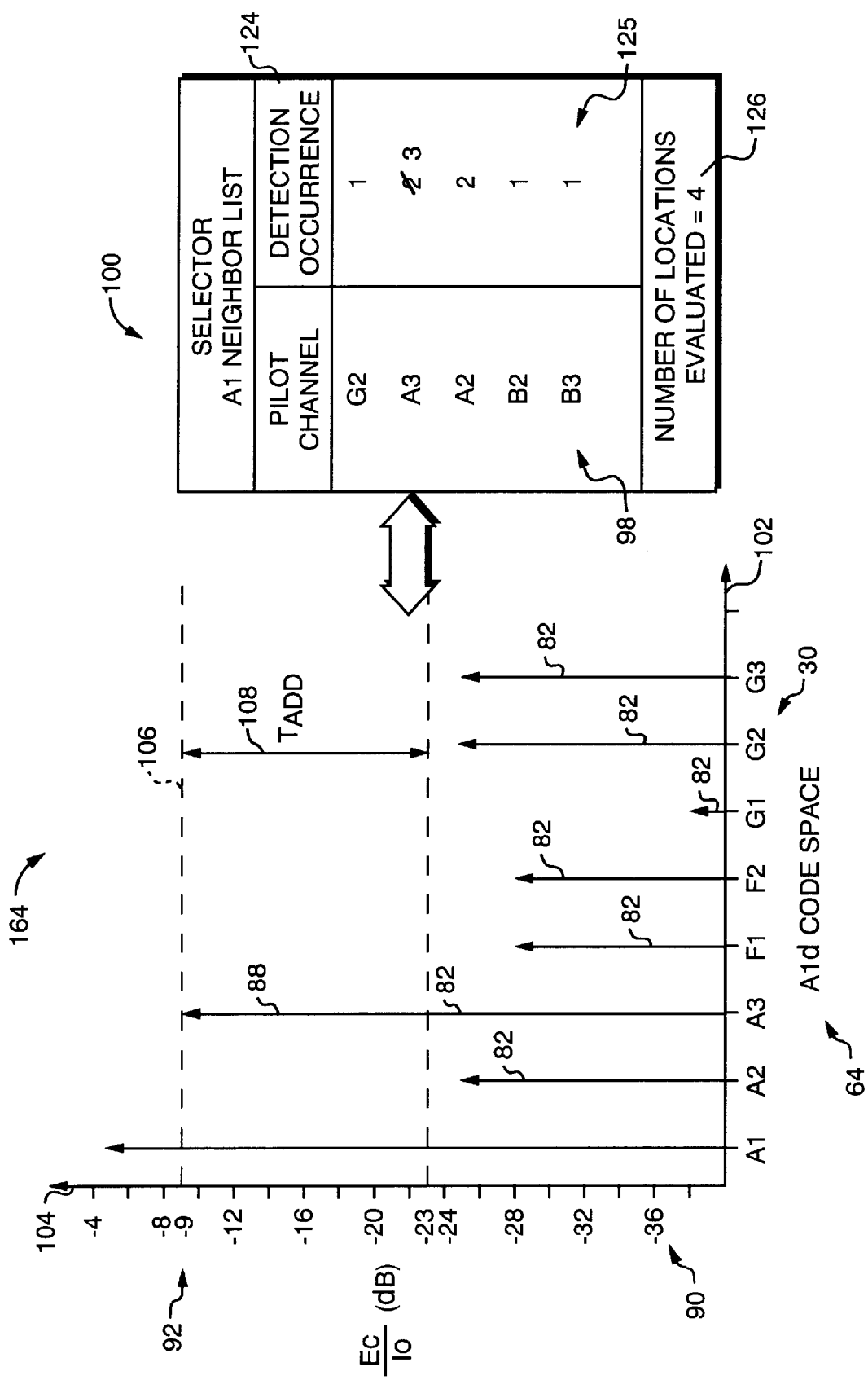
FIG. 9 shows a graph exemplifying the detection occurrence counter being incremented in the preliminary neighbor list in response to the detection of a candidate handoff pilot channel in a fourth location.

FIG. 9 shows a graph 164 exemplifying detection occurrence counter 124 being incremented in preliminary neighbor list 100 in response to detection of a single candidate handoff channel 98, labeled A3, in a fourth location, A1d, 64. Candidate handoff channel 98, A3, was previously included in preliminary neighbor list 100. Accordingly, its associated detection occurrence value 125 in detection occurrence counter 124 is incremented from two to three in response to its detection in fourth location, A1d, 64 during a fourth iteration of tasks 62, 80, 86, 94, 112, 114, 118, 116, 122, and 128.

In the exemplary scenario shown in graph 164, primary pilot channel 88, labeled A3, exhibits a primary signal quality 92, $E_c/I_o$ of −9 dB. Signal quality threshold window 108 is established having maximum value 106 substantially equivalent to primary signal quality 88, a width of approximately −14 dB, and minimum value 110 substantially equivalent to an $E_c/I_o$ of −23 dB. However, none of the signal qualities of neighbor pilot channels 82 fall within signal quality threshold window 108. Accordingly, graph 164 illustrates a single handoff scenario in which primary pilot channel 88 is only eligible for single handoff.

Referring, momentarily to table 130 (FIG. 6), an eighth entry 166 exemplifies the updated statistics for candidate handoff channel 98, labeled A3. An "X" is shown in single handoff subfield 142 for eighth entry 166 indicating that candidate handoff channel 98, labeled A3, is eligible for single handoff only.

Referring back to process 36 (FIG. 3), when query task 148 determines that all locations 64 in a selected one of sectors 26 (FIG. 1) have been evaluated, process 36 proceeds to a query task 166. At query task 166, processor 38 (FIG. 2) determines if a quantity of candidate handoff channels 98 in preliminary neighbor list 100 (FIG. 9) exceeds a predetermined neighbor list limit. For example, a network planner may determine that neighbor lists 56 (FIG. 2) for each of sectors 26 (FIG. 1) should be limited to four of candidate handoff channels 98.

When query task 166 determines that the quantity of candidate handoff channels 98 in preliminary neighbor list 100 does not exceed the predetermined neighbor list limit, process 36 proceeds to a task 168.

At task 168, processor 38 (FIG. 2) records preliminary neighbor list 100 in neighbor list record 46 (FIG. 2) as neighbor list 56 (FIG. 2) for the selected one of sectors 26 (FIG. 1).

However, when query task 166 determines that the quantity of candidate handoff channels 98 in preliminary neighbor list 100 exceeds the predetermined neighbor list limit, process 36 proceeds to a task 170. For example, following the evaluation of all four of locations 64, as shown in FIG. 9, there is a total of five candidate handoff channels 98 in preliminary neighbor list 100. Accordingly, query task 166 determines that the quantity of candidate handoff channels 98 exceeds the predetermined neighbor list limit of four and program control proceeds to task 170.

At task 170, processor 38 (FIG. 2) arranges candidate pilot channels 98 (FIG. 9) in a ranked order in response to the updated statistics collected during the execution of task 128. The ranking of candidate handoff channels 98 establishes a likelihood of candidate handoff channels 98 to be selected for inclusion in the neighbor set for a mobile station, such as mobile station 32 (FIG. 1) residing in the selected one of sectors 26. The selection of candidate handoff channels 98 from a neighbor list arranged in a ranked order increases the likelihood that for the majority of locations 64 (FIG. 1) in the selected one of sectors 26 (FIG. 1), a candidate handoff channel 98 is available. In a CDMA network, such as network 20 (FIG. 1), a signal in handoff causes less interference which leads to a better quality of service and enhanced network capacity.

FIG. 10 shows an exemplary neighbor list record 46 of three neighbor lists 56 for three sectors 26 (FIG. 1) identified in a site name field 172 and a sector number field 174. A neighbor site name field 176 and a neighbor sector number field 178 identify a sector server 28 (FIG. 1) from which an associated one of candidate handoff channels 98 is transmitted. Thus, neighbor site name and neighbor sector number fields 176 and 178 denote candidate handoff channels 98 in neighbor list 56 for an associated one of sectors 26 identified in site and sector number fields 172 and 174, respectively.

In each of neighbor lists 56, candidate handoff channels 98 are placed in a ranked order according to a percentage of two-way handoff shown in a two-way handoff field 180. In other words, candidate handoff channels 98 are prioritized according to the proportion of locations 64 (FIG. 1) in which they are eligible for two-way handoff. Thus, candidate handoff channels 98 having a greater two-way handoff potential, in terms of percentage, are ranked higher than those candidate handoff channels 98 having a lower two-way handoff potential.

Greater importance is placed in a prioritization scheme based on two-way handoff rather than a single handoff percentage 181 because secondary pilot channel 120 (FIG. 5) will help primary pilot channel 88 (FIG. 5) into soft or softer handoff during two-way handoff, thus lower the link requirement for the same quality of service over that of single handoff. A three-way handoff field 182 illustrates the proportion of locations 64 (FIG. 1) at which candidate handoff channels 98 are eligible for three-way handoff. However, a lower importance is placed on three-way handoff than two-way handoff because in a three-way handoff scenario another secondary pilot channel 120 (FIG. 7) already provides soft or softer handoff potential.

Each percentage in two-way handoff field 180, three-way handoff field 182, and single handoff percentage 181 is calculated as a proportion of the quantity of locations 64 at which a particular two-way handoff status, three-way handoff status, or single handoff was determined relative to the total quantity of locations 64 evaluated for the selected sector.

For example, referring to table 130 (FIG. 6), candidate handoff channel 98, labeled A3 was detected in three locations 64, shown in location detected field 134, labeled A1a, A1c, and A1d. In each of locations 64, labeled A1a and A1c, candidate handoff channel, A3, 98 was eligible for two-way handoff as shown by an "X" in two-way handoff subfield 138. Total count 126 (FIG. 9) shows that four locations 64 were evaluated for the selected sector 26, labeled A1. Thus, in this example, candidate handoff channel 98, labeled A3, would have a two-way handoff percentage equivalent to fifty percent.

Referring back to neighbor list record 46 (FIG. 10), for each of neighbor lists 56 a summation of each percentage in two-way handoff field 180, each percentage in three-way handoff field 182, and single handoff percentage 181 totals one hundred percent. This summation indicates that each location evaluated is characterized in terms of its handoff status.

FIG. 11 shows an exemplary neighbor list record 46' in which candidate handoff channels 98 shown in FIG. 10 are placed in a ranked order according to a percentage of traffic carried. FIG. 11 shows three neighbor lists 56 for three sectors 26 (FIG. 1), identified in site name field 172 and a sector number field 174. Neighbor site name field 176 and neighbor sector number field 178 identify a sector server 28 (FIG. 1) from which an associated one of candidate handoff channels 98 is transmitted.

In each of neighbor lists 56, candidate handoff channels 98 are placed in a ranked order according to a percentage of traffic carried as shown in a traffic carried field 184. The percentage of traffic carried, assuming that there is at least one unit of traffic carried at those locations is a summation of the proportion of locations 64 (FIG. 1) at which candidate handoff channels 98 are eligible for either two-way or three-way hand-off. In this illustrative example, the percentages shown in traffic carried field 184 are calculated by summing the percentages in two-way and three-way handoff fields 180 and 182, respectively, of neighbor list record 46 (FIG. 10).

As shown in neighbor list record 46', candidate handoff channels 98 are prioritized according to the proportion of locations 64 (FIG. 1) in which they are eligible for two-way handoff or three-way handoff. Thus, candidate handoff channels 98 having a greater traffic carried potential, in terms of percentage, are ranked higher than those candidate handoff channels 98 having a lower traffic carried potential.

The ranked order for a neighbor list 56 arranged according to percentage of two-way handoff, shown in neighbor list record 46 (FIG. 10), may differ from the ranked order for the same neighbor list 56 arranged according to percentage of traffic carried, shown in neighbor list record 46' (FIG. 11). Referring to FIG. 10 in which candidate handoff channels 98 are ranked according to a percentage of two-way handoff shown in two-way handoff field 180, a first neighbor list 56' for a 12$^{th}$ street site, sector 1, shows candidate handoff channel 98, labeled 12$^{th}$ street, sector 3, being prioritized higher than candidate handoff channel 98, labeled Avenue S, sector 3. Referring to FIG. 11 in connection with FIG. 10, when the same candidate handoff channels 98 are ranked according to the percentage of traffic carried, as shown in traffic carried field 184 of a second neighbor list 56", candidate handoff channel 98, labeled Avenue S, sector 3, is prioritized higher than candidate handoff channel 98, labeled 12$^{th}$ street, sector 3.

FIGS. 10 and 11 illustrate two techniques for arranging candidate handoff channels 98 in a ranked order. However, other techniques may be employed for prioritizing candidate handoff channels 98 utilizing the statistics gathered during the execution of neighbor list determination process 36 (FIG. 3). For example, other neighbor lists may rank candidate handoff channels 98 according to detection occurrences 125 (FIG. 9). Detection occurrences 125 in detection occurrence counter 124 indicate the number of locations 64 at which each of candidate handoff channels 98 may spend in an active set of a mobile station, such as mobile station 32 (FIG. 1). Thus, detection occurrences 125 can be used to compute a duration spent in an active set in terms of percent of total serving area, i.e., total count 126 (FIG. 9) of locations 64 (FIG. 1). Alternatively, a neighbor list may rank candidate handoff channels 98 according to signal qualities 90 (FIG. 9) relative to primary signal quality 92 (FIG. 9) of primary pilot channel 88 (FIG. 9).

With reference back to neighbor list determination process 36 (FIG. 3), following task 170 in which candidate handoff channels 98 are arranged in a ranked order, process 36 proceeds to a task 186. Task 186 causes processor 38 (FIG. 2) to select the top N candidate handoff channels 98 for neighbor list 56 for the selected one of sectors 26 from preliminary neighbor list 100 (FIG. 9). In other words, the highest ranked ones of candidate handoff channels are selected for inclusion into neighbor list 56 up to the predetermined neighbor list limit.

For example, if the neighbor list limit was four, the execution of task 186 results in the selection of the top four candidate handoff channels. Referring momentarily back to neighbor list record 46 (FIG. 10), a selection of the top four candidate handoff channels 98 in a first neighbor list 56' results in the selection of candidate handoff channels 98 transmitted from 12$^{th}$ street, sector 3, Avenue S, sector 3, 12$^{th}$ street, sector 2, and Avenue T, sector 2.

Following task 186, process 36 proceeds to a task 188. Likewise, following task 168, process 36 proceeds to task 188. At task 188, processor 38 (FIG. 2) ensures that a reciprocity condition is met. That is, pilot channel 30 (FIG. 1) for the "current" sector 28 (FIG, 1), i.e., the sector selected at task 60, is included as one of candidate handoff channels 98 on neighbor lists 56 for each of neighbor sectors 75 (FIG. 1) having their corresponding pilot channels 30 on the neighbor list 56 for the "current" sector 28.

Following task 188, a query task 190 is performed. Query task 190 causes processor 38 (FIG. 2) to determine if there is another one of sectors 26 (FIG. 1) for which a neighbor list 56 (FIG. 3) is to be determined. When there is another one of sectors 26, process 36 loops back to task 60 to select the next sector, and process 36 is repeated for the next one of sectors 26 (FIG. 1). Accordingly, through the execution of process 36, a comprehensive evaluation of each location 64 (FIG. 1) at each sector 26 (FIG. 1) of each cell 24 (FIG. 1). is performed. This comprehensive evaluation is streamlined by ensuring that a reciprocity condition is met through the execution of task 188. When query task 190 determines that neighbor lists 56 (FIG. 3) have been created for all sectors 26 of CDMA network 20 (FIG. 1) process 36 exits.

In summary, the present invention teaches of a method and system for determining a neighbor list for a code division multiple access (CDMA) sector in a radio communication network are provided. The method and system take into account the underlying CDMA network performance by evaluating each possible mobile station location in the CDMA cell. Statistics are accrued for each location at which the candidate handoff channels are detected. These statistics include the detection occurrences, the signal quality at the location, and eligibility for two-way, three-way, or single handoff. These statistics are subsequently utilized to arrange the neighbor list of the CDMA cell in a ranked order such that the candidate handoff channels having a higher rank have a greater likelihood to be selected for inclusion in the neighbor set of a mobile station residing in that CDMA cell. This results in less potential for dropped calls, smooth handoffs, and better quality of service.

Although the preferred embodiments of the invention have been illustrated and described in detail, it will be readily apparent to those skilled in the art that various modifications may be made therein without departing from the spirit of the invention or from the scope of the appended claims. For example, the tasks described herein may be performed in a different order.

What is claimed is:

1. A computer-based method of determining a neighbor list for a code division multiple access (CDMA) sector in a radio communications network, said network including neighbor CDMA sectors proximate said CDMA sector, and said method comprising:

detecting, at locations in said CDMA sector, neighbor broadcast channels transmitted from said neighbor CDMA sectors;

distinguishing, for each of said locations, a first broadcast channel from said neighbor broadcast channels detected at said each location;

establishing, for said each location, a signal quality threshold window in response to signal quality of said first broadcast channel;

identifying, for said each location, second broadcast channels from said neighbor broadcast channels, each of said second broadcast channels being identified when signal quality of said each second broadcast channel is within said signal quality threshold window; and including said first and said second broadcast channels as candidate handoff channels in said neighbor list for said CDMA sector.

2. A computer-based method as claimed in claim 1 wherein said CDMA sector includes a plurality of said locations, and said method further comprises performing said detecting, distinguishing, establishing, identifying, and including operations for each of said locations in said CDMA sector.

3. A computer-based method as claimed in claim 1 wherein said distinguishing operation includes:

determining signal quality for each of said detected neighbor broadcast channels; and choosing one of said neighbor broadcast channels having a greatest signal quality as said first broadcast channel.

4. A computer-based method as claimed in claim 1 further comprising setting a maximum value of said signal quality threshold window to be substantially equivalent to said signal quality of said first broadcast channel.

5. A computer-based method as claimed in claim 1 wherein said neighbor list is utilized to form a neighbor set of said candidate handoff channels for a mobile station residing in said CDMA sector, and said method further comprises arranging said candidate handoff channels in said neighbor list in a ranked order, said ranked order characterizing a likelihood of said candidate handoff channels being selected for inclusion in said neighbor set.

6. A computer-based method as claimed in claim 5 wherein said arranging operation comprises:

ascertaining detection occurrences for said candidate handoff channels, said detection occurrences being responsive to a quantity of said locations at which corresponding ones of said candidate handoff channels are one of said first and said second broadcast channels; and setting said ranked order such that those of said candidate handoff channels having greater ones of said detection occurrences than others of said candidate handoff channels have a greater likelihood of being selected for inclusion in said neighbor set.

7. A computer-based method as claimed in claim 6 wherein said ascertaining operation comprises:

maintaining detection occurrence counters for each of said candidate handoff channels; and incrementing a value in one of said detection occurrence counters at each instance of distinguishing a corresponding one of said neighbor broadcast channels as said first broadcast channel and at each instance of identifying said corresponding one of said neighbor broadcast channels as one of said second broadcast channels.

8. A computer-based method as claimed in claim 5 wherein said arranging operation comprises:

ascertaining two-way handoff occurrences for said candidate handoff channels, said two-way handoff occurrences being responsive to a quantity of said locations at which corresponding ones of said candidate handoff channels are eligible for two-way handoff; and setting said ranked order such that those of said candidate handoff channels having greater ones of said two-way handoff occurrences than others of said candidate handoff channels have a greater likelihood of being selected for inclusion in said neighbor set.

9. A computer-based method as claimed in claim 8 wherein said ascertaining operation comprises:

maintaining two-way handoff counters for each of said candidate handoff channels;

identifying those of said locations at which said detected neighbor broadcast channels include said first broadcast channel and one of said second broadcast channels, said first broadcast channel and said one second broadcast channel forming a channel pair eligible for said two-way handoff;

incrementing a first one of said two-way handoff counters associated with said first broadcast channel of said channel pair; and incrementing a second one of said two-way handoff counters associated with said second broadcast channel of said channel pair.

10. A computer-based method as claimed in claim 5 wherein said arranging operation comprises:

ascertaining traffic carried values for said candidate handoff channels, said traffic carried values being responsive to a quantity of said locations at which corresponding ones of said candidate handoff channels are eligible for one of two-way handoff and three-way handoff; and setting said ranked order such that those of said candidate handoff channels having greater ones of said traffic carried values than others of said candidate handoff channels have a greater likelihood of being selected for inclusion in said neighbor set.

11. A computer-based method as claimed in claim 1 wherein said CDMA sector is a first CDMA sector, one of said neighbor CDMA sectors is a second CDMA sector, and said method further comprises including a broadcast channel transmitted from said first CDMA sector as one of said candidate handoff channels in a second neighbor list for said second CDMA sector when a first one of said candidate handoff channels in said neighbor list for said first CDMA sector is transmitted from said second CDMA sector.

12. A computer-based method as claimed in claim 1 wherein said broadcast channels are pilot channels.

13. A computer-based method as claimed in claim 1 wherein said signal quality corresponds to signal strength relative to interference.

14. A computer-readable storage medium containing executable code for instructing a computer to create a neighbor list for a code division multiple access (CDMA) sector in a radio communications network, said radio communications network including neighbor sectors proximate said CDMA sector, said executable code instructing said computer to perform operations comprising:

detecting, at locations in said CDMA sector, neighbor pilot channels transmitted from said neighbor CDMA sectors;

determining signal quality for each of said detected neighbor pilot channels;

distinguishing, for each of said locations, a primary pilot channel from said neighbor pilot channels detected at said each location, said primary pilot channel being one of said neighbor pilot channels having a greatest signal quality;

establishing, for said each location, a signal quality threshold window in response to said signal quality of said primary pilot channel;

identifying, for said each location, secondary pilot channels from said neighbor pilot channels, each of said secondary pilot channels being identified when signal quality of said each secondary pilot channel is within said signal quality threshold window;

including said primary and said secondary pilot channels as candidate handoff channels in said neighbor list for said CDMA sector; and arranging said candidate handoff channels in said neighbor list in a ranked order, said ranked order establishing a likelihood of said candidate handoff channels being selected for inclusion in a neighbor set for a mobile station residing said CDMA sector.

15. A computer-readable storage medium as claimed in claim 14 wherein said executable code instructs said computer to perform a further operation of setting a maximum value of said signal quality threshold window to be substantially equivalent to said signal quality of said primary pilot channel.

16. A computer-readable storage medium as claimed in claim 14 wherein said executable code instructs said computer to perform further operations comprising:

ascertaining detection occurrences for said candidate handoff channels, said detection occurrences being responsive to a quantity of said locations at which corresponding ones of said candidate handoff channels are one of said primary and said secondary pilot channels; and setting said ranked order such that those of said candidate handoff channels having greater ones of said detection occurrences than others of said candidate handoff channels have a greater likelihood of being selected for inclusion in said neighbor set.

17. A computer-readable storage medium as claimed in claim 14 wherein said executable code instructs said computer to perform further operations comprising:

ascertaining two-way handoff occurrences for said candidate handoff channels, said two-way handoff occurrences being responsive to a quantity of said locations at which corresponding ones of said candidate handoff channels are eligible for two-way handoff; and setting said ranked order such that those of said candidate handoff channels having greater ones of said two-way handoff occurrences than others of said candidate handoff channels have a greater likelihood of being selected for inclusion in said neighbor set.

18. A computer-readable storage medium as claimed in claim 14 wherein said executable code instructs said computer to perform further operations comprising:

ascertaining traffic carried values for said candidate handoff channels, said traffic carried values being responsive to a quantity of said locations at which corresponding ones of said candidate handoff channels are eligible for one of two-way handoff and three-way handoff; and setting said ranked order such that those of said candidate handoff channels having greater ones of said traffic carried values than others of said candidate handoff channels have a greater likelihood of being selected for inclusion in said neighbor set.

19. A computing system for determining neighbor lists for each of a plurality of code division multiple access (CDMA) sectors in a radio communication network, said neighbor lists being utilized to form neighbor sets of candidate handoff channels for a mobile station residing in one of said CDMA sectors, said computing system comprising:

an input element for receiving a pilot channel detection database for said radio communications network, said database including a plurality of locations for each of said CDMA sectors and pilot channels transmitted from said CDMA sectors and detected at corresponding ones of said locations;

a processor, in communication with said input element, for creating said neighbor lists of said candidate handoff channels from said pilot channels in said pilot channel detection database, one each of said neighbor lists corresponding to one each of said CDMA sectors, wherein for each of said locations in a first one of said CDMA sectors, said processor performs operations comprising:

determining when said pilot channels detected at said each location are neighbor pilot channels, said neighbor pilot channels being transmitted from said CDMA sectors proximate said first CDMA sector;

when said pilot channels detected at said each location are said neighbor pilot channels, distinguishing a first one of said neighbor pilot channels as a primary pilot channel;

establishing a signal quality threshold window having a maximum value substantially equivalent to a primary signal quality of said primary pilot channel;

when others of said neighbor pilot channels detected at said each location have secondary signal qualities within said signal quality threshold window, identifying said others of said neighbor pilot channels as secondary pilot channels; and including said primary and said secondary pilot channels as said candidate handoff channels in a first neighbor list for said first CDMA sector; and a memory element, in communication with said processor, for storing said neighbor lists for said CDMA sectors, said candidate handoff channels in each of said neighbor lists being arranged in a ranked order, said ranked order establishing a likelihood for said neighbor pilot channels to be selected for inclusion in said neighbor sets.

20. A computing system as claimed in claim 19 wherein said processor arranges said candidate handoff channels in said ranked order according to detection occurrences of said candidate handoff channels, each of said detection occurrences being responsive to a quantity of said locations in said first CDMA sector at which an associated one of said candidate handoff channels is one of said primary and said secondary pilot channels.

21. A computing system as claimed in claim 19 wherein said processor arranges said candidate handoff channels in said ranked order according to two-way handoff occurrences of said candidate handoff channels, each of said two-way handoff occurrences being responsive to a quantity of said locations in said first CDMA sector at which an associated one of said candidate handoff channels is eligible for two-way handoff.

22. A computing system as claimed in claim 19 wherein said processor includes a pilot channel transmitted from said first CDMA sector as one of said candidate handoff channels in a second neighbor list for a second one of said second CDMA sectors when a first one of said candidate handoff channels in said neighbor list for said first CDMA sector is transmitted from said second CDMA sector.

* * * * *